(12) United States Patent
Chinn et al.

(10) Patent No.: US 10,391,444 B2
(45) Date of Patent: Aug. 27, 2019

(54) SYSTEMS AND METHODS TO DEBOTTLENECK AN INTEGRATED OIL AND GAS PROCESSING PLANT WITH SOUR GAS INJECTION

(71) Applicant: Chevron U.S.A. Inc., San Ramon, CA (US)

(72) Inventors: Daniel Chinn, Danville, CA (US); Nitesh Bhuwania, Richmond, CA (US); Shabbir Husain, Houston, TX (US); Ronald P. MacDonald, Mill Valley, CA (US); Tapan K. Das, Albany, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 15/971,748

(22) Filed: May 4, 2018

(65) Prior Publication Data

US 2019/0105601 A1 Apr. 11, 2019

Related U.S. Application Data

(60) Provisional application No. 62/569,707, filed on Oct. 9, 2017.

(51) Int. Cl.
*B01D 53/14* (2006.01)
*C10L 3/10* (2006.01)
(Continued)

(52) U.S. Cl.
CPC .......... *B01D 53/1468* (2013.01); *C10L 3/103* (2013.01); *E21B 43/34* (2013.01);
(Continued)

(58) Field of Classification Search
CPC .......... B01D 53/1468; B01D 2257/304; B01D 2252/204; B01D 2256/24; B01D 2311/02; B01D 2311/04; B01D 65/00; B01D 63/00; B01D 61/00; B01D 61/58; C10L 3/103; C10L 2290/548; C10L 2290/46; C10L 2290/541; C10L 2290/54; C10L 3/102; E21B 43/34; E21B 43/40
See application file for complete search history.

(56) References Cited

U.S. PATENT DOCUMENTS

| 8,869,890 B2 | 10/2014 | Chinn et al. |
| 2012/0168154 A1* | 7/2012 | Chinn ............... E21B 43/34 166/267 |

(Continued)

*Primary Examiner* — Timothy C Vanoy
(74) *Attorney, Agent, or Firm* — Karen R. DiDomenicis (57) ABSTRACT

Disclosed are systems and methods for producing oil and gas while removing hydrogen sulfide from fluids produced from oil and gas reservoirs and injecting a sour gas stream containing the hydrogen sulfide into an underground formation. Hydrogen sulfide-selective membranes are used to debottleneck known systems and methods by removing hydrogen sulfide from bottlenecked plant process steps including sour gas compression, hydrogen sulfide removal and sour gas injection. Pressure ratio across the membranes can also be manipulated to provide further debottlenecking. Gas-gas eductors are also disclosed for use in leveraging relatively high-pressure streams to boost the pressure of low pressure streams. Oil production is thus increased.

11 Claims, 7 Drawing Sheets

(51) Int. Cl.
E21B 43/34 (2006.01)
E21B 43/40 (2006.01)

(52) U.S. Cl.
CPC ........ E21B 43/40 (2013.01); *B01D 2252/204* (2013.01); *B01D 2256/24* (2013.01); *B01D 2257/304* (2013.01); *C10L 2290/46* (2013.01); *C10L 2290/541* (2013.01); *C10L 2290/548* (2013.01)

(56) References Cited

U.S. PATENT DOCUMENTS

2018/0363978 A1    12/2018  Ballaguet et al.
2019/0105600 A1*   4/2019   Chinn ................ B01D 53/1468

\* cited by examiner

SYSTEMS AND METHODS TO DEBOTTLENECK AN INTEGRATED OIL AND GAS PROCESSING PLANT WITH SOUR GAS INJECTION

FIELD

The present disclosure relates generally to the field of systems and methods for producing oil and gas from oil and gas reservoirs while removing hydrogen sulfide from produced fluids produced from the oil and gas reservoirs and for injecting a sour gas stream containing the hydrogen sulfide into an underground formation. The present disclosure further relates to the use of membranes in such systems and methods.

BACKGROUND

Production of fluids from oil and gas reservoirs containing high levels of hydrogen sulfide ($H_2S$) requires the separation of the $H_2S$ from both the produced oil and the produced natural gas and the safe disposal thereof. There are at least two widely practiced methods of processing natural gas with high $H_2S$. In one known method, the entire $H_2S$-containing natural gas stream (also referred to herein as sour gas) is dehydrated, compressed, and reinjected at high pressure in an underground formation. In another known method, the gas is sweetened in an amine unit using amine scrubbing, followed by dehydration and optionally fractionation to extract propane and butane prior to being sold as sales gas (containing mostly methane, ethane and some nitrogen). The $H_2S$ and $CO_2$ removed from gas processing in the amine unit (collectively referred to as acid gas) are sent to a Sulfur Recovery Unit (SRU) where the $H_2S$ is converted to elemental sulfur via the well-known Claus reaction. An additional tail-gas treating unit may provide further treatment to ensure that $SO_X$ emissions are minimal.

To process the oil phase from the produced fluids, after separation from the natural gas phase and water in one or more three-phase separators, the oil stream is often flashed in one or more stages to remove light components (including $H_2S$). Lastly, the oil is sent to a stabilizer column which further strips more light ends and $H_2S$ from the oil to meet a final vapor-pressure specification on the product oil. All of the gases from the flash steps in the oil processing along with the stabilizer overhead gases may be combined, recompressed, and mixed with the sour gas. Some integrated facilities include parallel trains for oil production integrated with sour gas processing and sour gas injection.

The known integrated facilities described above have several limitations. For one thing, the inlet gas-to-oil ratio (GOR) and % $H_2S$ in oil and gas production fields tend to increase over time as the reservoir ages and with prolonged sour gas injection. Facilities are designed with finite limits on $H_2S$ treating, sulfur conversion capacity and sour gas injection capacity. Reservoir pressure also drops over time as the reservoir ages. To ensure that feed gas is supplied to the facilities at adequate and consistent pressure, one known method is to install field compression near the wellheads to boost the inlet pressure. This pressure boost compressor also has a limited capacity. Furthermore, there are times when market prices for the treated natural gas are low, and thus oil production is the main revenue source for such integrated facilities. Oil production then becomes constrained by a facility's ability to dispose of the sour gas, either by processing or by injection. Reaching capacity in one or more parts of the plant often results in bottlenecks in which other parts of the plant are underutilized and thus capacity is wasted.

It would be desirable to find ways to debottleneck integrated facilities that treat produced fluids containing high levels of hydrogen sulfide that include oil production, sour gas processing and sour gas injection.

SUMMARY

In one aspect, a system for increasing oil and/or gas production in an integrated oil and gas production plant including hydrogen sulfide removal and sour-gas injection is provided. The system includes: a separator for separating produced fluid from a subterranean reservoir into an associated gas stream containing 1-50% hydrogen sulfide by volume, a water stream and an oil stream; an associated gas compressor for compressing a first portion of the associated gas stream; a hydrogen sulfide-selective membrane to remove hydrogen sulfide from the first portion of the associated gas stream and form a permeate stream enriched in hydrogen sulfide and a retentate stream depleted in hydrogen sulfide and enriched in hydrocarbon gases; a first gas processing plant for receiving a feed gas stream including the retentate stream and a portion of the oil stream from the separator, wherein the first gas processing plant includes an amine unit for removing hydrogen sulfide from the feed gas stream and producing a hydrogen sulfide-enriched stream and a hydrocarbon-enriched stream; and a Claus unit for producing elemental sulfur from the hydrogen sulfide-enriched stream. The system further includes: a second gas processing plant for receiving and compressing a second portion of the associated gas stream and a portion of the oil stream from the separator to form a second compressed associated gas stream (after receiving the associated gas stream and a portion of the oil stream and then flashing that mixture), wherein the second gas processing plant includes one or more gas compressors; a permeate compressor or an eductor for increasing a permeate stream pressure of the permeate stream to form a compressed permeate stream; and a sour gas compressor for receiving and compressing the second compressed associated gas stream and the compressed permeate stream to form a sour gas injection stream for injecting into a subterranean formation.

In another aspect, a method for increasing oil and/or gas production in an integrated oil and gas production plant including hydrogen sulfide removal and sour-gas injection is provided. The method includes the following steps: separating a feed stream of produced fluid from a subterranean reservoir into an associated gas stream containing 1-50% hydrogen sulfide by volume, a water stream and an oil stream; compressing a first portion of the associated gas stream in an associated gas compressor to form a first compressed associated gas stream; passing the first compressed associated gas stream over a hydrogen sulfide-selective membrane to remove hydrogen sulfide from the first portion of the associated gas stream and form a permeate stream enriched in hydrogen sulfide and a retentate stream depleted in hydrogen sulfide and enriched in hydrocarbon gases. The method further includes: feeding a feed gas stream comprising the retentate stream and a gas stream separated from the oil stream to a first gas processing plant, wherein the feed gas stream passes through an amine unit for removing hydrogen sulfide from the feed gas stream thereby producing a hydrogen sulfide stream and a hydrocarbon enriched stream and wherein the hydrogen sulfide stream passes through a Claus unit for removing sulfur from the hydrogen sulfide stream removed thereby producing elemental sulfur; feeding a second portion of the associated gas stream to a second gas processing plant comprising one or more gas compressors wherein the second portion of the associated gas stream is compressed to form a second compressed associated gas stream; increasing a permeate stream pressure of the permeate stream in a permeate compressor or an eductor; receiving and compressing the second compressed associated gas stream and the compressed permeate stream in a sour gas compressor to form a sour gas injection stream; and injecting the sour gas injection stream into a subterranean formation.

In yet another aspect, a method of retrofitting an integrated oil and gas production plant is provided. The integrated plant includes a separator for separating produced fluid from a subterranean reservoir into an associated gas stream containing 1-50% hydrogen sulfide by volume, a water stream and an oil stream, a compressor for boosting pressure of the associated gas stream, a hydrogen sulfide removal unit comprising an amine unit and/or a Claus unit for removing hydrogen sulfide from the associated gas stream and a sour-gas injection unit for injecting a sour gas injection stream into a subterranean formation. The method of retrofitting includes adding a hydrogen sulfide-selective membrane downstream of the compressor to remove hydrogen sulfide from the associated gas stream and form a permeate stream enriched in hydrogen sulfide and a retentate stream depleted in hydrogen sulfide and enriched in hydrocarbon gases; such that less hydrogen sulfide is sent to the compressor and hydrogen sulfide removal unit than in the integrated oil and gas production plant without the hydrogen sulfide-selective membrane and the integrated oil and gas production plant has an increased oil and/or gas production rate as compared with the integrated oil and gas production plant without the hydrogen sulfide-selective membrane.

BRIEF DESCRIPTION OF THE DRAWINGS

These and other objects, features and advantages of the present invention will become better understood referring to the following description and accompanying drawings. The drawings are not considered limiting of the scope of the disclosure. Reference numerals designate like or corresponding, but not necessarily identical, elements. The drawings illustrate only example embodiments. The elements and features shown in the drawings are not necessarily to scale, emphasis instead being placed upon clearly illustrating the principles of the example embodiments. Additionally, certain dimensions or positionings may be exaggerated to help visually convey such principles.

DETAILED DESCRIPTION

Figure 1:
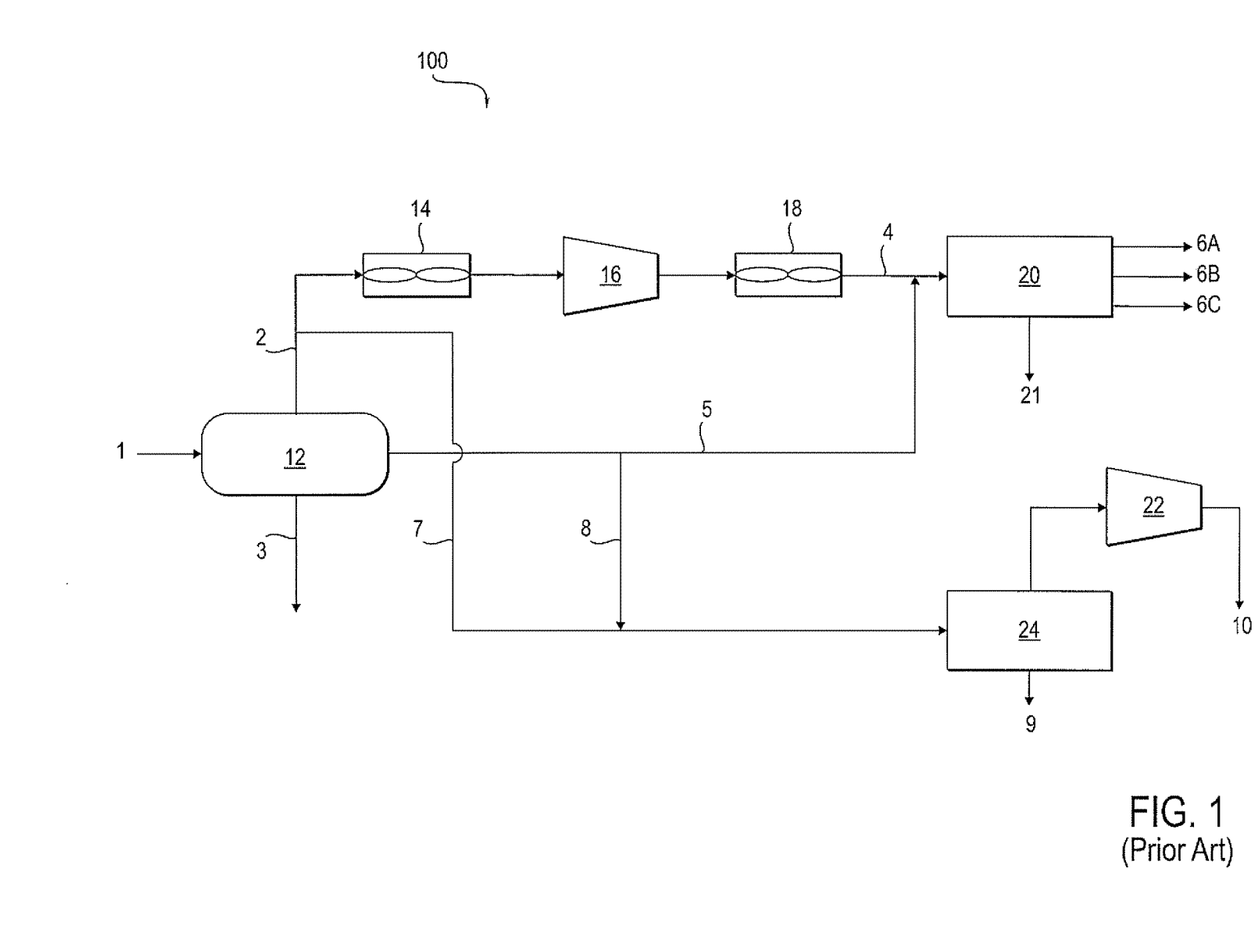
FIG. 1 shows a schematic diagram of a plant for gas processing and gas injection in accordance with the prior art.

In one embodiment, fluids from one or more oil and gas reservoirs feed parallel facilities that process sour gas and/or inject sour gas. The reservoirs may have been producing for many years and may have experienced a rapid loss in reservoir pressure and increased GOR. For this reason, pressure boosting by compression is required. Referring to FIG. 1, a schematic diagram of a plant 100 that is currently practiced in the art is shown. A feed stream 1 of produced fluids from at least one reservoir (not shown) is fed to a separator 12 for separating produced fluids from the reservoir into associated gas 2, water 3 and crude oil 5 streams, the associated gas stream 2 containing at least 1 to 50 vol % hydrogen sulfide. Separator 12 may be any of a few different types of equipment for separating the fluids such as a water/gas/crude oil separator. As is well known to those skilled in the art of hydrocarbon production, equipment in separator 12 may include by way of example and not limitation single or multi-stage separators, free water knock-out tanks, oil stabilization columns, gunbarrel or oil settling tanks, control valves (pressure, level, temperature, flow), compressors, pumps, stock tanks, water skimmers etc.

The water phase or stream 3 is removed from the separator 12 for further processing or disposal (not shown). The water 3 may be injected in a subterranean formation for either disposal or to assist in the pressure maintenance of a reservoir. Or else, the water may be further treated to remove contaminants such as dispersed oil, dissolved or soluble organic components, treatment chemicals (biocides, reverse emulsion breakers, corrosion inhibitors), produced solids (sand, silt, carbonates, clays, corrosion products), scales, bacterial, metals (iron, manganese, etc.), salts, and NORM (naturally occurring radioactive material), sodium content, and boron content such that the water may be suitable for irrigation. Or if even further treated, the water may be turned into potable water suitable for consumption by humans and animals. Other non-limiting uses of the separated and treated water might include boiler feed water for steam generation.

The associated gas stream 2 is removed overhead from the separator and fed to an air cooler 14. Associated gas 2 typically has a composition, by way of example and not limitation, including water, carbon dioxide, hydrogen sulfide, nitrogen, methane, ethane, propane, normal and iso-butane, normal and iso-pentane, normal and iso hexane, etc. Associated gas 2 from the air cooler 14 is then fed to a pressure boost compressor 16. Compressed associated gas is then cooled in a second air cooler 18. Stream 4 has a temperature suitable for feeding to a gas processing plant 20. In one embodiment, the temperature of stream 4 is at least 60° C.

The gas processing plant 20 includes one or more sulfur removal units that may include an amine unit including at least two vessels (an absorber and regenerator) and a Claus unit. Sour gas stream (stream 4) and oil (stream 5) are combined and sent to an inlet separator (not shown) located in plant 20. Sour gas leaving the inlet separator can be sent to an amine unit (not shown) where acid gases, such as $H_2S$ and $CO_2$, are stripped from the sour gas stream thus producing an enriched acid gas stream and an enriched hydrocarbon stream. As a non-limiting example, the acid gas stream may include a small amount of hydrocarbons, typically methane ($C_1$), water vapor, carbon dioxide ($CO_2$), and hydrogen sulfide ($H_2S$). Acid gas stream is then sent to a Claus unit (not shown) which is well known to those skilled in the art of treating acid gases that include relative high concentrations of hydrogen sulfide ($H_2S$). The Claus unit may convert at least a portion of the $H_2S$ into elemental sulfur, which may be subsequently transported and sold for commercial uses like fertilizer and sulfuric acid.

The gas processing plant 20 further includes oil processing, where oil separated from plant 20's inlet separator (not shown) goes through additional medium and low-pressure separators and finally becomes stabilized oil such as by using a conventional stabilizer column (not shown) to produce stabilized oil 21 and product streams 6A (sweet gas), 6B (LPG), and 6C (sulfur). In oil processing, gases are removed from the oil 5 by flashing in one or more gas-oil-water separator vessels (not shown) operating at successively lower pressures. Associated gases from the overhead of each separator vessels may be recompressed in one or more wet gas compressors, cooled, and combined to a single sour gas stream for further processing. Stabilized oil 21 refers to a hydrocarbon product that is generally ready for transport to a refinery for further processing into desired products such as naphtha, gasoline, diesel, etc, and generally refers to oil that is substantially free of dissolved hydrocarbons gases. Such oil may be stored in a vented tank at atmospheric pressure or transported through a pipeline. Actual specifications for stabilized oil may vary but often the stabilized oil has a Reid Vapor Pressure (RVP) of 10-12 psia. $H_2S$ specification may vary. However, by way of example and not limitation, $H_2S$ content may be on the order of 10-60 parts per million.

The gas processing plant 20 can further include a gas dehydration unit, a deethanizer column, followed by a depropanizer column, and then a debutanizer column (not shown) where hydrocarbons in the associated gas stream 2 are separated into different saleable products. These separated gases typically include sales gases, which comprise methane, ethane, nitrogen, with small amounts of propane and higher hydrocarbons. Also, a liquefied petroleum gas stream including LPG ($C_3$, $C_4$) is typically separated out. A stream of heavier gases ($C_4$+) is also separated out by gas processing plant 20. Fluids of $C_4$+ are often liquid at ambient conditions (20° C., 1 atmosphere). This liquid stream can be combined with crude oil and sent to the stabilizer column to produce the stabilized stream 21 of crude oil that is suitable for transport, as described above.

Side stream 7 is diverted from gas phase 2 and directed to a second plant 24. A side stream 8 is also diverted from oil phase 5 and directed to the second plant 24. Plant 24 includes oil processing (not shown) as described with reference to plant 20 above. Stabilized oil stream 9 is the primary product from Plant 24. The sour gas injection facility, shown as a single compressor 22, includes wet gas compression, dehydration and dry gas compression, so that a stream of gas containing hydrogen sulfide 10 can be injected into a subterranean formation (not shown). The sour gas injection facility 22 can compress the sour gas to from approximately 1000 psia to 10,000 psia depending on the pressure needed to inject the sour gas into the subterranean formation.

In one embodiment, oil production is increased or maximized while addressing the simultaneous constraints of limited capacity of (1) the pressure boost compressor 16, (2) the sour-gas processing plant 20, and (3) the sour-gas-injection compressor 22. Hydrogen sulfide-selective membranes are added to the integrated plant such that all three facilities are debottlenecked. In one embodiment, oil and/or sales gas production is also increased.

Figure 2:
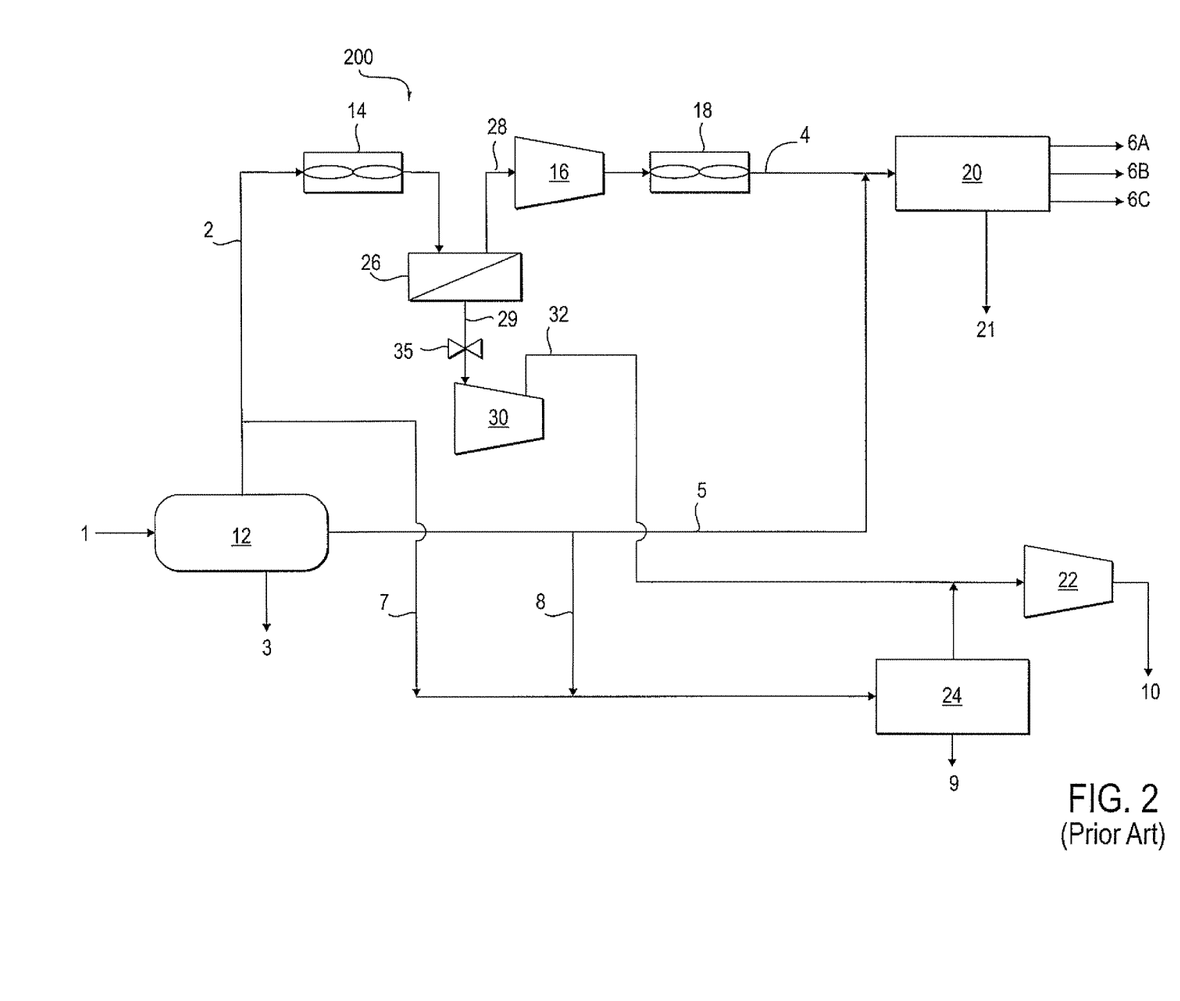
FIG. 2 shows a schematic diagram of a plant for gas processing and gas injection in accordance with certain example embodiments.

FIG. 2 shows a retrofitted production facility 200. Alternatively, production facility 200 could be a new production unit that is initially built including membranes for the separation of acid gases from associated gases. Referring to FIG. 2, in one embodiment, a $H_2S$-selective membrane 26 is located just upstream of the pressure boost compressor 16. The membrane 26 separates the membrane feed stream 2 into a permeate stream 29 enriched in hydrogen sulfide and carbon dioxide and a retentate stream 28 depleted in hydrogen sulfide and carbon dioxide but enriched in hydrocarbon gases. The gas fed to the membrane 26 has a temperature of from 35 to 50° C., even from 35 to 45° C. The membrane retentate stream 28 then passes to the pressure boost compressor 16. In one embodiment, the removal of the hydrogen sulfide and carbon dioxide from the associated gas 2 by the membrane 26 allows the amine unit of the gas processing plant 20 to process a greater quantity of associated gases than if the hydrogen sulfide and carbon dioxide had not been removed by the membrane 26. The retentate stream 28 from the membrane 26 is fed to the suction side of the pressure boost compressor 16 and then fed to the gas processing plant 20. Thus, more sour gas (higher flowrate but with lower $H_2S$ concentration) can be sent to the gas processing plant 20 than in the plant 100 shown in FIG. 1 without the membrane 26. This is because the feed rate of gas can be increased and/or the ratio of gas to oil is increased. This ensures that the retentate stream 28 from the membrane 26 is depleted in $H_2S$ while matching the maximum capacity of the pressure boost compressor 16 along with matching both amine's and sulfur plant's $H_2S$ processing capacity in plant 20. Since the feed to the gas processing plant 20 has a reduced level of hydrogen sulfide but with higher total flowrate, the level of hydrogen sulfide throughout the overall plant is thus kept the same as in plant 100. The difference is that it has been found to be possible to increase sweet gas production of the overall plant by up to 40%. It has likewise been found to be possible to increase oil production of the overall plant by up to 20%. In one embodiment, at least a portion of the permeate stream 29 is sent to the sour gas injection compressor 22 for injecting into an underground formation.

In this and all embodiments, the $H_2S$-selective membrane 26 may be any polymeric membrane known for use in membranes, including but not limited to cellulose acetate, cellulose triacetate, polyimide, or rubbery membranes such as polyether block amide (PEBAX) and polyurethanes that preferentially permeates $H_2S$ over hydrocarbons such as methane, ethane, propane and butane. Preferably the membranes have a mixed-gas $H_2S/CH_4$ selectivity of 10 or greater when measured at 35° C. and 300 psig feed. In another embodiment, the selectivity is at least 20. In yet another embodiment, the selectivity is at least 40. Also, ideally, the $H_2S$ permeance is 0.4-times or greater than the $CO_2$ permeance when measured at 35° C. and 300 psig feed. In another embodiment, the $H_2S$ permeance is greater than 0.6 times the $CO_2$ permeance. And in yet another embodiment, the $H_2S$ permeance is greater than 0.9 times the $CO_2$ permeance. With respect to the form of the membrane, by way of example and not limitation, the form of the membrane may be a hollow fiber or spiral wound. Those skilled in the art of membrane separation of gases will appreciate that other configuration of membranes may be used to separate gases.

Table 1 shows some exemplary data of a lab-scale membrane exhibiting preferential selectivity of $H_2S$ and $CO_2$ over methane. This membrane is similar to those disclosed in US Pat. Publication No. 2010/0186586A1, and U.S. Pat. Nos. 6,932,859B2, and 7,247,191B2.

TABLE 1

Gas Separation Using 6fda:Dam:Daba (3:2) Crosslinked Membrane

| FEED | Temp (deg C.) | Feed (psig) | Permeance CH4 (GPU) | Permeance $CO_2$ (GPU) | Permeance $H_2S$ (GPU) |
|---|---|---|---|---|---|
| Pure Gas CH4 and Pure Gas $CO_2$ | 35 | 300 | 1.2 | 55 | N/A |
| 4.1% $H_2S$, 21% C02 74.9% CH4 | 38 | 905 | 0.55 | 13 | 5.6 |
| 20.5% $H_2S$, 3.9% $CO_2$, and 75.6% CH4 | 38 | 300 | 0.85 | 22 | 13 |
| | 38 | 605 | 0.71 | 17 | 10 |
| | 54 | 300 | 0.98 | 22 | 12 |
| | 54 | 575 | 0.87 | 18 | 10 |

Modules have 3 fibers, 260 micron OO, 12.5 cm L (effective area = 3.06 cm2). Shell-side feed, Permeate pressure = 0 psig, Stage Cut <1.2%, Feed Flow: 244-256 sec/min In one embodiment, the permeate stream 29 from the permeate side of the hydrogen sulfide-selective membrane 26 is directed to a permeate compressor 30. The high-$H_2S$ permeate stream from membrane 26, having dropped in pressure as it passes through the membrane separation unit 26, is recompressed in permeate compressor 30 so that the pressure of the permeate stream 29 matches the suction pressure of the sour gas injection compressor 22. The permeate stream can be mixed with the flash gases and stabilizer overhead gases from the oil processing section of plant 24, to be sent to the sour gas injection compressor 22 for sour gas injection. This arrangement allows for a higher $H_2S$ concentration gas (permeate 29) to be reinjected into the formation.

The injection stream 10 to be injected into a subterranean formation (not shown) has a higher $H_2S$ content than stream 10 of FIG. 1, and provides the long-term advantage of improved sweep efficiency. References disclosing the improvement of injecting $H_2S$-gas mixtures vs. $CO_2$ and sweet gas include SPE86605 (Abou-Sayed et al., 2004, The Management of Sour Gas by Underground Injection-Assessment, Challenges and Recommendations) and SPE97628 (Abou-Sayed et al., 2005, An Assessment of Engineering, Economical and Environmental Drives of Sour Gas Management by Injection). This improved efficiency is due to the increased viscosity and higher density of the injected sour gas, leading to more effective voidage replacement and sweep efficiency.

Retentate stream 28, enriched in hydrocarbon gas concentration is passed to the amine plant in plant 20 to strip acid gases from stream 28. A stream of enriched acid gases is subsequently produced by the amine plant. Sulfur (6C) may be produced through conversion of the hydrogen sulfide in the acid gas stream in a SRU unit. A sweetened hydrocarbon gas stream is produced after the amine plant removes a large portion of the acid gases. The sweetened hydrocarbon gas stream is sent to a gas processing unit where gases are separated into a sales gas stream (6A), LPG product stream (6B) and sulfur (6C). A stabilized crude oil stream 21 is produced in the stabilizer column.

Typically, the most valuable products produced by facility 200 are the streams 21 and 9 of crude oil. A facility 100 can be retrofitted by adding membrane unit 26 to remove a substantial portion of the $H_2S$ and $CO_2$ from the associated gases 2 so that the amine plant has a lower load of acid gases to remove for a given amount of produced fluid and stabilized oil produced. Also, the sour gas injected by sour gas injection unit 22 carries a higher percentage of $CO_2$ and $H_2S$ gas than without the use of the membrane unit 26. Higher levels of $H_2S$ and $CO_2$ in this injection stream is beneficial, since both $H_2S$ and $CO_2$ can provide longer-term benefits of more efficient displacement of oil in a subterranean reservoir.

In one embodiment, the bottlenecked plant 100 shown in FIG. 1 can be retrofit to obtain the debottlenecked plant 200 shown in FIG. 2. In order to accomplish the retrofit, line 2 is disconnected upstream of the pressure boost compressor 16 and downstream of air cooler 14 and reconnected to the inlet of the membrane 26. The retentate outlet of the membrane 26 is connected to the inlet of the pressure boost compressor 16. The permeate compressor 30 is connected to the permeate outlet of the membrane 26. A valve 35 is installed between the membrane 26 and the new permeate compressor 30 for controlling the permeate pressure. The outlet of the permeate compressor 30 is connected to the inlet of one of the stages of the sour gas injection compressor 22 as appropriate according to its pressure. Because there can be a large increase in pressure when gas is compressed for injection, there can be multiple stages of compression. For example, if gas is compressed from 7 bar suction to 500 bar discharge for injection, this may be accomplished in stages of compression of 7 to 20 bar, 20 to 70 bar, 70 to 140 bar, 140 to 280 bar and 280 to 500 bar. Each stage of compression has a separate suction and discharge. Thus, if the permeate compressor 30 produces 20 bar permeate 29, the permeate 29 would be sent to the 20 bar suction pressure stage of the sour gas injection compressor 22.

Figure 3:
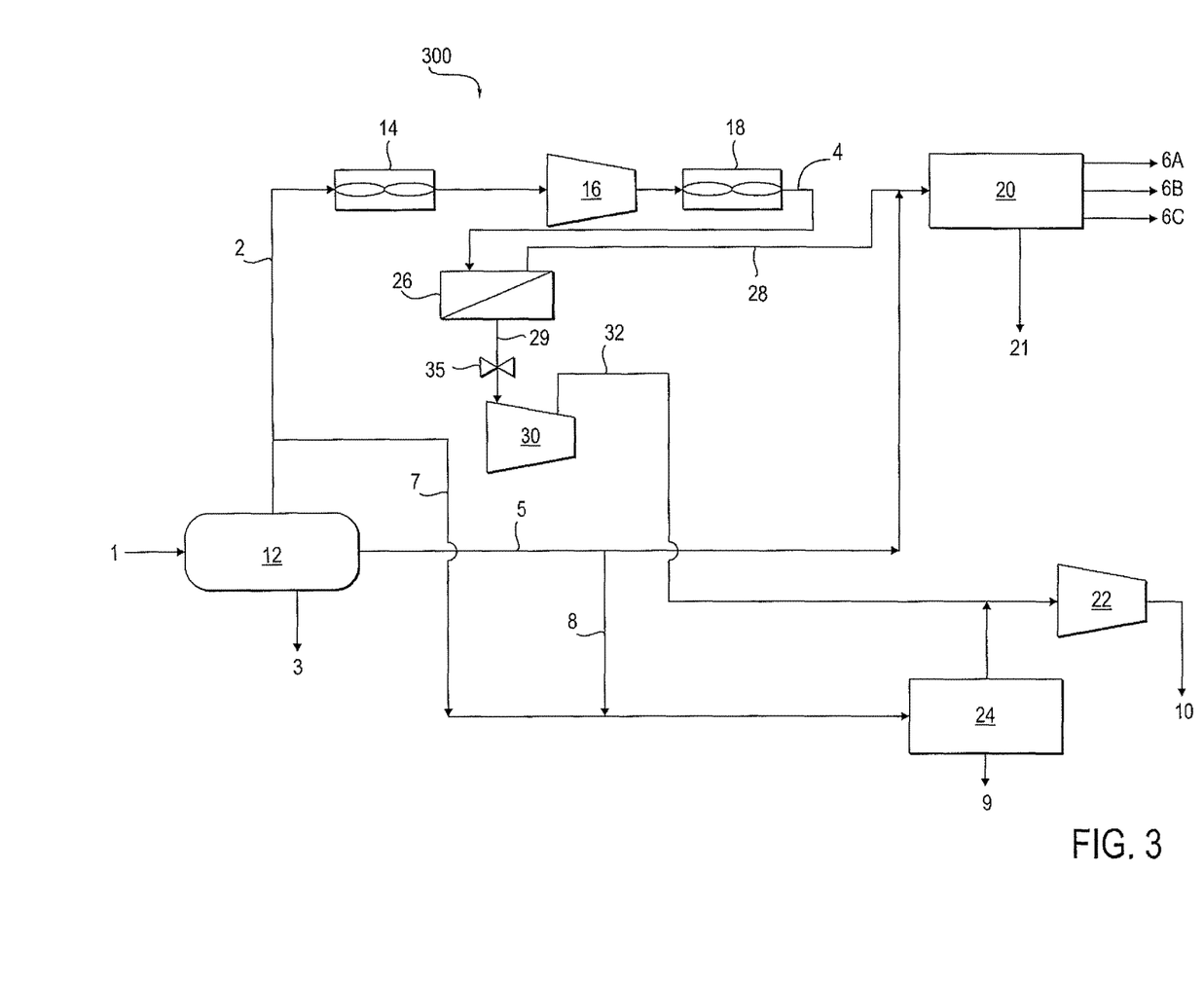
FIG. 3 shows a schematic diagram of a plant for gas processing and gas injection in accordance with certain example embodiments.

Referring to the plant 300 shown in FIG. 3, in another embodiment, the $H_2S$-selective membrane 26 is in a different location than in the plant 200 shown in FIG. 2. As shown in FIG. 3, the $H_2S$-selective membrane 26 is located on the discharge side of the pressure boost compressor 16, just after the air cooler 18. The high-$H_2S$ permeate stream 29 from the permeate side of the membrane 26 is recompressed in the permeate compressor 30 so that the pressure matches the suction pressure of one of the stages of the sour gas injection compressor 22. Again, the permeate stream 29 can be mixed with the flash gases and stabilizer overhead gases from the oil processing portion of plant 24, which then gets sent to the sour gas injection compressor 22 for sour gas injection.

In one embodiment, the bottlenecked plant 100 shown in FIG. 1 can be retrofit to obtain the debottlenecked plant 300 shown in FIG. 3. In order to accomplish the retrofit, line 4 is disconnected downstream of air cooler 18 downstream of the pressure boost compressor 16 and reconnected to the inlet of the membrane 26. The retentate outlet of the membrane 26 is connected to the inlet of the gas processing plant 20. The permeate compressor 30 is connected to the permeate outlet of the membrane 26. A valve 35 is installed between the membrane 26 and the permeate compressor 30 for controlling the permeate pressure. The outlet of the permeate compressor 30 is connected to the inlet of the sour gas injection compressor 22.

Figure 4:
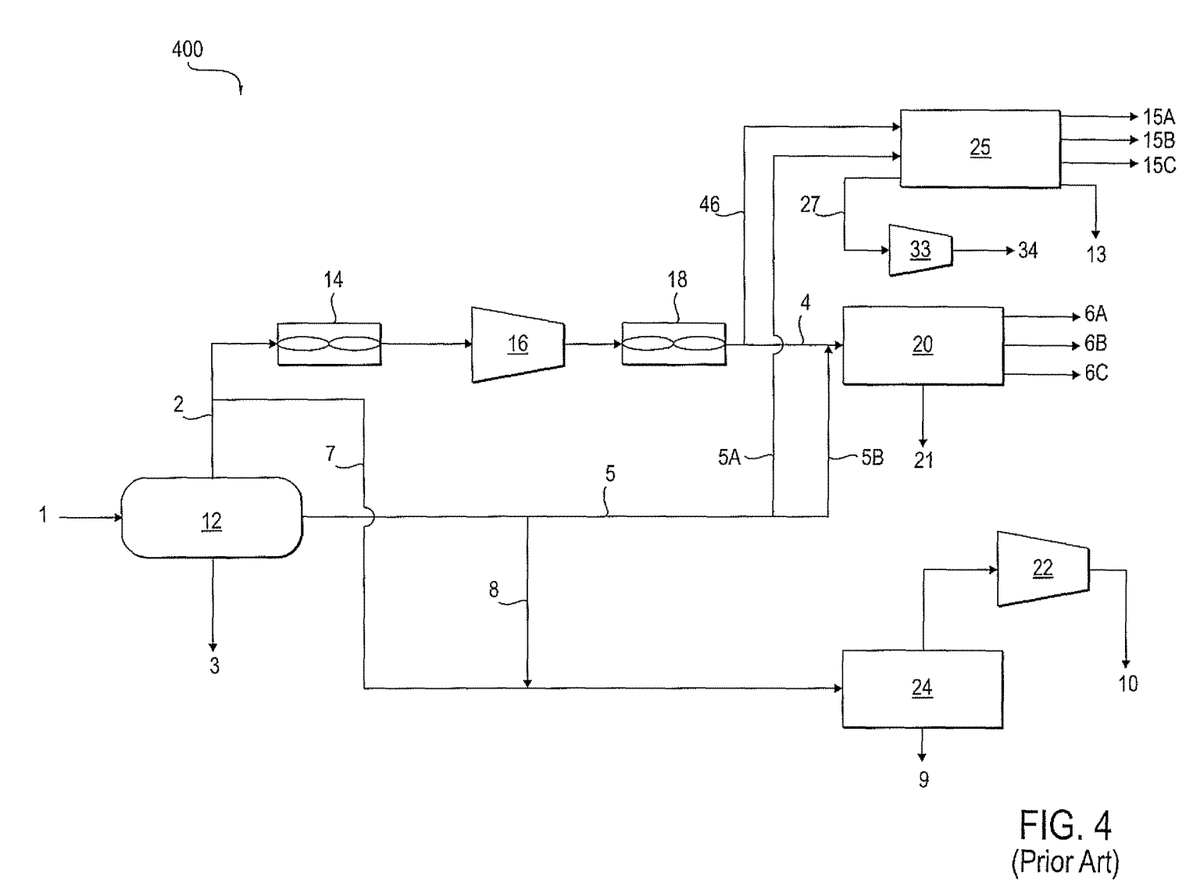
FIG. 4 shows a schematic diagram of a plant for gas processing and gas injection in accordance with the prior art.

FIG. 4 shows a known schematic diagram of a plant 400 that is currently practiced in the art. The plant 400 of FIG. 4 is very similar to the plant 100 shown in FIG. 1, with the addition of another gas processing plant 25 and further splitting of the compressed gas stream from compressor 16. As before, gas streams 2 and 7 are taken from the separator 12. Compressed gas from compressor 16 goes through air cooler 18 prior to being split into gas stream 4 entering plant 20 and gas stream 46 entering plant 25. Oil stream 5 is split into stream 5A feeding plant 25, stream 5B feeding plant 20, and stream 8 feeding plant 24. The inlet pressure of gas processing plant 25 is roughly equivalent to the inlet pressure of gas processing plant 20. Plant 25 includes amine units, a Claus unit and oil processing (not shown) as described above. Product stream 15A (sweet gas), 15B (LPG), and 15C (sulfur) and stabilized oil stream 13 are produced, as well as sour gas stream 27. Sour gas stream 27 is compressed in sour gas injection compressor 33 thereby producing a sour gas injection stream 34 for injection into an underground formation (not shown).

The plant 400 shown in FIG. 4 has additional flexibility compared to FIG. 1 since there are additional facilities for sour gas processing in 25 and sour gas injection (33). However, in the situation when the GOR increases, the plant 400 of FIG. 4 will still face bottlenecks, i.e., the overall plant 400 has certain undesirable limitations. For example, the crude stabilizer, wet gas compressors, amine units, and sulfur recovery units within facility 25 can all be limited in terms of capacity. The sour gas compression unit 33 can be capacity limited as well.

Figure 5:
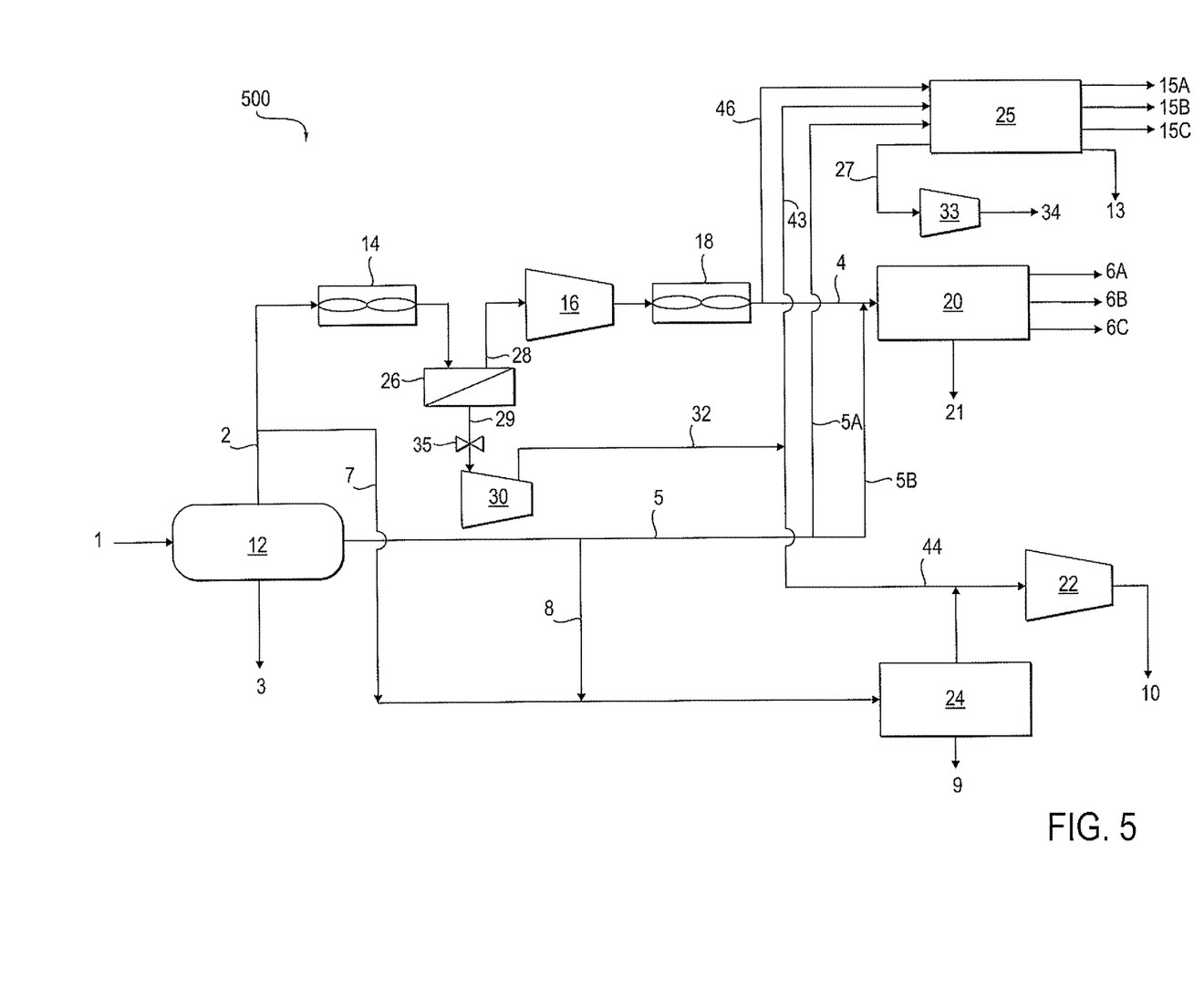
FIG. 5 shows a schematic diagram of a plant for gas processing and gas injection in accordance with certain example embodiments.

FIG. 5 shows a retrofitted production facility 500 based on the plant of FIG. 4 having been debottlenecked in the same manner as in the debottlenecked plant shown in FIG. 2 and described above with reference to FIG. 2. Alternatively, production facility 500 could be a new production unit that is initially built including membranes for the separation of acid gases from associated gases, such that the overall plant 500 would be debottlenecked as compared with the plant 400 of FIG. 4. In FIG. 5, the compressed retentate stream is split between stream 46 feeding plant 25 and stream 4 feeding plant 20. Thus, the product stream leaving the membrane 26 goes to both plants 20 and 25. Stream 32 having been compressed in permeate compressor 30 is split into stream 43 and stream 44. Stream 43 feeds plant 25. Stream 44 is combined with the sour gas output by plant 24 to be fed to sour gas injection compressor 22. The permeate 29 from the membrane 26 thus eventually goes to both compressor 33 and compressor 22. Note that in this embodiment, compressor 16 serves both plant 20 and plant 25 and therefore has a higher inlet capacity as compared with the known systems. In one example, the inlet capacity of compressor 16 is 33% higher than in the prior art systems 100 and 400 shown in FIG. 1 and FIG. 4.

In cases where the inlet GOR increases, all of the gas processing and injection facilities (20, 24, 25, 22, 33) are bottlenecked in terms of capacity. The use of membrane 26 positioned at the suction of compressor 16 removes the bottlenecks in the amine and Claus plants in Plants 20 and 25. Membrane 26 also enables increasing the flowrate of stream 2 while decreasing the flowrate of stream 7. This enables debottlenecking of plant 24 and compressor 22 in terms of handling total gas flow. The permeate stream 29 is compressed in permeate compressor 30 to match the suction pressure of one of the stages of either compressor 33 and/or 22. Compared to the prior art of FIG. 4, the process shown in FIG. 5 enables one to produce greater amount of oil and sweet gas. The addition of a membrane and permeate compressor enables even greater flexibility in handling sour gas in situations when the GOR increases continuously.

In one embodiment, the bottlenecked plant 400 shown in FIG. 4 can be retrofit to obtain the debottlenecked plant 500 shown in FIG. 5. In order to accomplish the retrofit, line 2 is disconnected upstream of the pressure boost compressor 16 and downstream of air cooler 14 and reconnected to the inlet of the membrane 26. The retentate outlet of the membrane 26 is connected to the inlet of the pressure boost compressor 16. The permeate compressor 30 is connected to the permeate outlet of the membrane 26. A valve 35 is installed between the membrane 26 and the new permeate compressor 30 for controlling the permeate pressure. The outlet of the permeate compressor 30 is connected to the inlet of one of the stages of the sour gas injection compressor 22 as appropriate according to its pressure.

Optimized Pressure Ratio for Acid Gas Compression for Sour Gas Injection Plants

When membranes are used to enrich a desired component, e.g., $H_2S$, in a hydrocarbon gas stream, the $H_2S$ is preferentially concentrated in the permeate stream, which is at a lower pressure than the feed. The ratio of the membrane feed pressure to the membrane permeate pressure (absolute pressure) is referred to as the "pressure ratio" and determines the maximum separation (i.e., maximum concentration of $H_2S$ in the permeate) that can be achieved for a membrane given its $H_2S$ selectivity over other gases ("$H_2S$/Other Gas selectivity"). In one embodiment, the pressure ratio is lowered for a given membrane operation.

In one embodiment, the pressure ratio is lowered for a given membrane operation where a very high permeate $H_2S$ concentration is not desired, e.g., for minimizing process risk. In this embodiment, the permeate $H_2S$ concentration is reduced by increasing the permeate pressure. This can be accomplished by partially closing valve 35.

Alternatively, the pressure ratio is lowered for a given membrane operation where high permeate $H_2S$ concentration cannot be achieved due to low $H_2S$/Other Gas selectivity. In this embodiment, the permeate stream requires less compression. A membrane or a set of membranes operated in series (if more than one) is used with staged feed and permeate pressures to allow for the production of higher permeate pressure streams for easier (i.e., fewer stages) of compression in permeate compressor 30. Additionally, the permeate pressure can be optimized to feed multiple pressure stages of the compressor 30. The use of a low pressure ratio across the membrane 26 also allows for the use of low selectivity but high-permeance membranes. Thus, advantageously, membranes that have become plasticized over time can still be used. By plasticized it is meant an increase in gas permeance and a reduction in the selectivity in the membrane for the preferred gas (in this case, $H_2S$) over other gases, e.g., the $H_2S$/Other Gas selectivity.

Further, the pressure ratios in a series of membranes can be adjusted for highest acid gas driving force across the series of membranes for optimal separation, producing multiple permeate streams at different pressures. Each membrane has a permeate control valve that can be set to a different pressure. Thus, for example, when gas is fed to two membranes in series at 300 psig, the valve on the first membrane permeate can be set to 75 psig and the second membrane permeate can be set to 50 psig.

Figure 6:
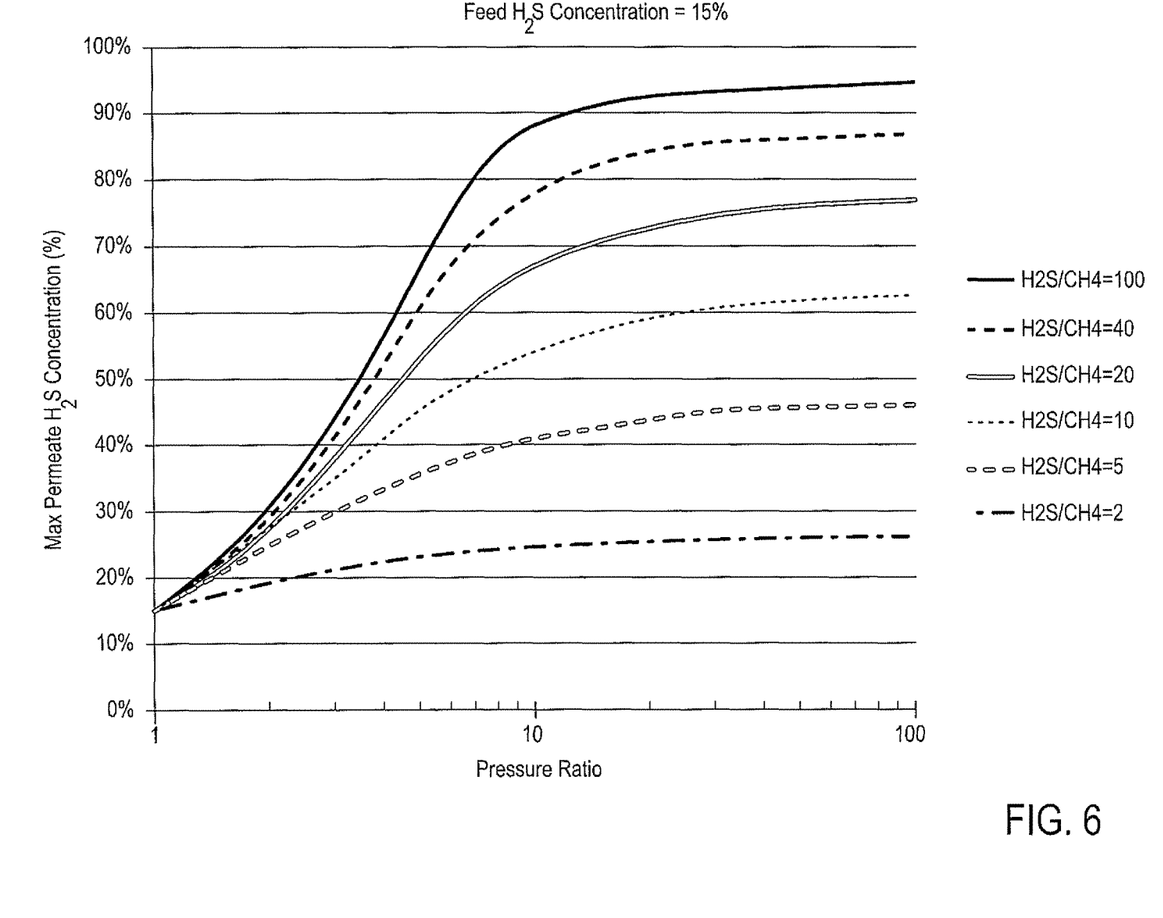
FIG. 6 shows a graph for use in determining pressure ratio across $H_2S$ selective membranes in accordance with one or more example embodiments.

FIG. 6 is a plot of maximum hydrogen sulfide concentration that could be achieved in the permeate stream as a function of the pressure ratio for different hydrogen sulfide/methane selectivity membranes with a binary feed gas of 15 volume % hydrogen sulfide, balance methane. The plot shown is for illustration purposes. A more reliable plot can be produced using membrane data when tested with real gas from an operational plant. In some embodiments, the desired hydrogen sulfide concentration in the permeate stream is between 30 and 80 volume %. As can be seen in FIG. 6, using the binary gas feed, increased concentration of $H_2S$ in the permeate can be achieved even with low pressure ratios and low membrane selectivity.

Using FIG. 6 or a similar plot, knowing the membrane selectivity and the desired hydrogen sulfide concentration in the permeate stream, the pressure ratio can be determined from the plot. From pressure ratio and the known feed pressure, the permeate pressure can be calculated. This can be set using control valve 35. Flow and $H_2S$ concentration on the permeate side of membrane 26 can be monitored. When flow and/or $H_2S$ concentration exceed desired ranges, control valve 35 can be used to adjust the pressure ratio for membrane 26. By restricting flow using valve 35, permeate pressure is increased and the pressure ratio is decreased. As a result, for a fixed membrane, less of the permeate stream 29 is compressed in permeate compressor 30 and more gas is sent to plant 20 and/or plant 25. A process control system can automatically adjust valve 35 in response to flow and $H_2S$ concentration on the permeate side of membrane 26.

Pressure Integration of High Acid Gas Streams

One advantage of adding a hydrogen sulfide-selective membrane 26 to an integrated plant as disclosed herein is the ability to reduce the total $H_2S$ going into a plant, e.g. plant 20 or plant 25, thus providing plant 20 or plant 25 with additional processing capacity. The use of the membrane 26 also results in a low pressure, high concentration $H_2S$ permeate gas stream 29. The disposal of the permeate gas stream 29 which has a hydrogen sulfide concentration that can exceed 50 volume % represents a two-fold challenge. Firstly, permeate gas 29 must be compressed for re-injection back into a subterranean formation. Secondly, processing of high concentration and high pressure $H_2S$ streams represents a significant hazard and Safe Processing Zones (SPZ) are determined based on the concentration and pressure of the gas stream. For personnel safety reasons, large SPZs within plant confines are undesirable. The combination of $H_2S$ concentration and pressure limits the use of membrane separation and transport (via piping) of permeate gas stream 29.

Figure 7:
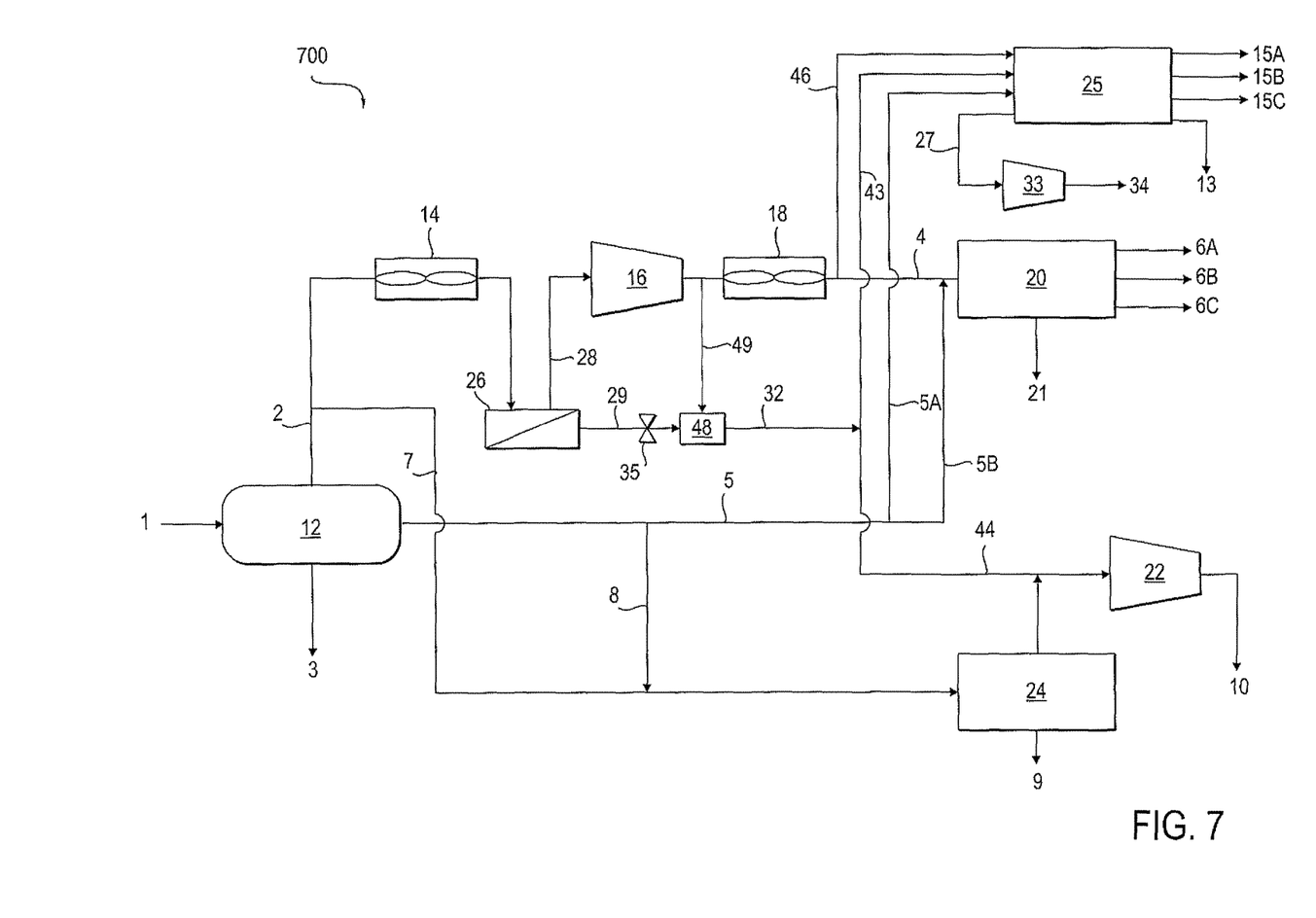
FIG. 7 shows a schematic diagram of a plant for gas processing and gas injection in which an eductor is employed in accordance with certain example embodiments.

Referring to FIG. 7, multiple sour gas streams are available at different pressures throughout the integrated plant 700, e.g., streams 2, 10, 27, 28, 29, and 34. In one embodiment, a gas-gas eductor 48 is used to combine one or more low-pressure, high $H_2S$ concentration streams with one or more high-pressure, moderate or low $H_2S$ concentration gas streams. Eductor 48 has a suction inlet for receiving the low-pressure gas, a motive inlet for receiving the higher-pressure gas, and an outlet for discharging an intermediate-pressure stream. The low-pressure stream, i.e., the suction fluid, can be the permeate stream 29. The higher-pressure stream, i.e., the motive fluid, can be any convenient gas stream having a pressure higher than the permeate stream 29. The educator 48 provides an economic alternative to a compressor to form the compressed permeate stream 32. As shown, a side stream 49 of compressed gas is sent to educator 48 as the motive fluid. If a continuously running spill-back valve is present, a stream can be diverted as the motive fluid. A mid-stage fluid of a compressor can also be diverted as the motive fluid. In one embodiment, the eductor 48 is placed upstream of a pressure drop device such as a valve where the previously wasted energy (i.e. a pressure drop) can be used to raise the pressure of the low pressure stream(s), e.g., stream of membrane permeate 29. Advantageously, a "separation penalty" can be minimized as gas streams with near equivalent $H_2S$ partial pressure driving force are mixed together. This embodiment provides several benefits. Compression costs are reduced since low pressure permeate gas streams are "pressure boosted" by higher-pressure gas streams, potentially resulting in fewer compression stages to reach the pressure needed for re-injection. This embodiment potentially allows smaller safe processing zones (SPZ) when $H_2S$-membranes are used since the $H_2S$ concentration of low-pressure, high-$H_2S$ streams is diluted by the combination with high-pressure, low-$H_2S$ streams. This enables a process control strategy by changing the permeate pressure continuously using different gas streams of different pressures as the motive fluid. The motive fluid flow rate can also be adjusted, e.g., using a valve. The permeate stream 32 can be sent to any of multiple streams in the overall integrated plant 700.

Flow rate and permeate pressure of the permeate stream 29 can be monitored. Pressures of various streams such as streams 10, 27 and 34 can be monitored with sensors. To achieve a target flow rate and/or permeate pressure of the permeate stream 29, one of the streams 10, 27 and 34 can be selected and diverted to the eductor 48 as the motive fluid. As a result, pressure of the permeate stream 29 is increased decreasing the need for a new membrane permeate compression.

EXAMPLES

All numerical values given below for component mass flows are used as examples only to illustrate the invention.

Comparative Example 1 (Without the Membranes—Base Case)

Referring to FIG. 1, production fluids 1 enter a three-phase separator 12 where produced water 3 is removed and treated and disposed of. A portion of the associated sour gas 2 is sent to the gas processing plant 20 while another portion 7 is sent to plant 24. Likewise, the oil stream 5 is divided between plant 20 and plant 24. Each plant has separate oil-processing equipment. The gas feeding plant 20 compressed to the appropriate pressure using compressor 16, which as an illustrative example has a capacity of 152 mass units. The gas processing plant 20 contains amine scrubbers, gas dehydration, sulfur recovery units, and tail gas treatment units and is limited in total $H_2S$ processing capacity of 17.25 mass units. Plant 24 bypasses compressor 16, since it has no facilities to process sour gas. Plant 24 is designed to reinject all sour gas with a limit of 145 mass units. In this prior art case, additional oil production beyond 45 mass units is not possible since the gas processing plant 20's $H_2S$ capacity and compressor 22's injection capacity are at their limits. The mass units of the various streams are given in Table 2.

TABLE 2

| Stream | Hydrocarbon Gas Mass Units | Sulfur Mass Units (as $H_2S$ or S) | Oil Mass Units |
|---|---|---|---|
| 1 | 219.94 | 38.81 | 45 |
| 2 | 97.65 | 17.23 | 0 |
| 3 | 0 | 0 | 0 |
| 4 | 97.65 | 17.23 | 0 |
| 5 | 0 | 0 | 20.25 |
| 6A + 6B | 97.65 | 0 | 0 |
| 6C | 0 | 17.23 | 0 |
| 7 | 122.29 | 21.50 | 0 |
| 8 | 0 | 0 | 24.75 |
| 9 | 0 | 0 | 24.75 |
| 10 | 122.29 | 21.58 | 0 |
| 21 | 0 | 0 | 20.25 |

Example 1

Table 1 (above) shows some exemplary data of a lab-scale membrane exhibiting preferential selectivity of $H_2S$ and $CO_2$ over methane. The membrane of Table 1 was used in the following Example 2.

Comparative Example 2 (With the Membranes—50% Acid Gas Removal)

The configuration 200 shown in FIG. 2 was used. The high-$H_2S$ permeate stream from membrane 26 is recompressed in permeate compressor 30 so that the pressure matches the suction pressure of existing compressor 22. The permeate stream is mixed with the flash gases and stabilizer overhead gases of plant 24, which then gets sent to compressor 22 for sour gas injection. More sour gas is diverted to compressor 22. In this example, the membrane removes 50% of the inlet $H_2S$ with total hydrocarbon loss of 12%. In this example, the production of well fluids (i.e., feed rate, i.e., of stream 1) is increased by 13%. Due to the membrane 26 reducing the $H_2S$ concentration while increasing total flow throughout the gas processing plant 20, it is possible to increase sweet gas production (i.e. stream 6A) by 40% and oil production (i.e. stream 21) by 13%. The mass units of the various streams are given in Table 3.

TABLE 3

| Stream | Hydrocarbon Gas Mass Units | Sulfur Mass Units (as $H_2S$ or S) | Oil Mass Units |
|---|---|---|---|
| 1 | 249.26 | 43.988 | 51 |
| 2 | 154.54 | 27.27 | 0 |
| 3 | 0 | 0 | 0 |
| 5 | 0 | 0 | 25.5 |
| 6A + 6B | 136 | 0 | 0 |
| 6C | 0 | 13.64 | 0 |
| 7 | 94.72 | 16.72 | 0 |
| 8 | 0 | 0 | 25.5 |
| 9 | 0 | 0 | 25.5 |
| 10 | 113.26 | 30.35 | 0 |
| 21 | 0 | 0 | 25.5 |
| 28 | 136 | 13.64 | 0 |
| 29 | 18.55 | 13.64 | 0 |
| 32 | 18.55 | 13.64 | 0 |

Comparative Example 3 (With the Membranes—50% Acid Gas Removal)

The configuration 300 shown in FIG. 3 was used. The production of well fluids (i.e. feed rate of stream 1) is increased by 4%. A slipstream of gas from Plant B is fed to the suction side of Compressor A. In this example, the membrane removes 50% of the inlet $H_2S$ with a total hydrocarbon loss of 10%. Due to the membrane reducing the $H_2S$ concentration while increasing total flow throughout the gas processing plant 20, it is possible to increase sweet gas production (i.e. stream 6A) by 18% and oil (i.e. stream 21) by 4%. The mass units of the various streams are given in Table 4.

TABLE 4

| Stream | Hydrocarbon Gas Mass Units | Sulfur Mass Units (as $H_2S$ or S) | Oil Mass Units |
|---|---|---|---|
| 1 | 229.71 | 40.538 | 47 |
| 2 | 128.64 | 22.70 | 0 |
| 3 | 0 | 0 | 0 |
| 5 | 9 | 9 | 23.5 |
| 6A + 6B | 115.78 | 0 | 0 |
| 6C | 0 | 11.35 | 0 |
| 7 | 101.07 | 17.84 | 0 |
| 8 | 0 | 0 | 23.5 |
| 9 | 0 | 0 | 23.5 |
| 10 | 113.94 | 29.19 | 0 |
| 21 | 0 | 0 | 23.5 |
| 28 | 115.78 | 11.35 | 0 |
| 29 | 12.86 | 11.35 | 0 |
| 32 | 12.86 | 11.35 | 0 |

Comparative Example 4 (Without the Membranes—Base Case)

The prior art configuration 400 shown in FIG. 4 was used. Due to the larger flows of oil and gas in this example, compressor 16's inlet capacity was raised 33% as compared with that of Comparative Example 1 to serve both plant 20 and plant 25. Plant 20's $H_2S$ processing capacity is still 17.25 mass units. Compressor 33 has a total flow capacity of 66 mass units. As a result, total oil production is 60 mass units and sweet hydrocarbon production is 127.56 mass units. The mass units of the various streams are given in Table 5.

TABLE 5

| Stream | Hydrocarbon Gas Mass Units | Sulfur Mass Units (as $H_2S$ or S) | Oil Mass Units |
|---|---|---|---|
| 1 | 293.25 | 51.75 | 60 |
| 2 | 170.09 | 30.02 | 0 |
| 3 | 0 | 0 | 0 |
| 4 | 85.06 | 15 | 0 |
| 5 | 0 | 0 | 30 |
| 5A | 0 | 0 | 15 |
| 5B | 0 | 0 | 15 |
| 6A + 6B | 85.04 | 0 | 0 |
| 6C | 0 | 15 | 0 |
| 7 | 123.17 | 21.74 | 0 |
| 8 | 0 | 0 | 30 |
| 9 | 0 | 0 | 30 |
| 10 | 123.17 | 21.74 | 0 |
| 13 | 0 | 0 | 15 |
| 15A + 15B | 42.52 | 0 | 0 |
| 15C | 0 | 7.50 | 0 |
| 21 | 0 | 0 | 15 |
| 27 | 42.52 | 7.50 | 0 |
| 34 | 42.52 | 7.50 | 0 |
| 46 | 85.04 | 15 | 0 |

Comparative Example 5 (With the Membranes—50% Acid Gas Removal)

The configuration 500 shown in FIG. 5 was used. A membrane 26 was added to the configuration of Comparative Example 4. In this comparative example, the membrane removes 50% of the inlet $H_2S$ with a total hydrocarbon loss of 12%. The product stream 28 leaving the membrane 26 goes to plant 20 and plant 25. The permeate from the membrane goes to injection compressors 33 and 22. With the membrane added, oil production is increased 12% and sweet gas production increased 34%. The mass units of the various streams are given in Table 6.

TABLE 6

| Stream | Hydrocarbon Gas Mass Units | Sulfur Mass Units (as $H_2S$ or S) | Oil Mass Units |
|---|---|---|---|
| 1 | 327.46 | 57.79 | 67 |
| 2 | 206.30 | 36.41 | 0 |

TABLE 6-continued

| Stream | Hydrocarbon Gas Mass Units | Sulfur Mass Units (as H$_2$S or S) | Oil Mass Units |
|---|---|---|---|
| 3 | 0 | 0 | 0 |
| 4 | 136.16 | 13.65 | 0 |
| 5 | 0 | 0 | 26.8 |
| 5A | 0 | 0 | 13.4 |
| 5B | 0 | 0 | 13.4 |
| 6A + 6B | 136.10 | 0 | 0 |
| 6C | 0 | 13.65 | 0 |
| 7 | 121.16 | 21.38 | 0 |
| 8 | 0 | 0 | 40.20 |
| 9 | 0 | 0 | 40.20 |
| 10 | 122.4 | 22.29 | 0 |
| 13 | 0 | 0 | 13.4 |
| 15A + 15B | 34.45 | 0 | 0 |
| 15C | 0 | 10.92 | 0 |
| 21 | 0 | 0 | 13.4 |
| 27 | 34.45 | 10.92 | 0 |
| 28 | 181.55 | 18.20 | 0 |
| 29 | 24.76 | 18.20 | 0 |
| 32 | 24.76 | 18.20 | 0 |
| 34 | 34.45 | 10.92 | 0 |
| 43 | 23.52 | 17.29 | 0 |
| 44 | 1.238 | 0.9102 | 0 |
| 46 | 45.39 | 4.55 | 0 |

TABLE 7

| | Total production (oil and gas) normalized relative to Comp. Ex. 4 | Wet gas split ratio (Plant 20 + Plant 25)/ Plant 24 | Product sweet gas from Plant 20 | Product oil from Plant 20 and Plant 24 |
|---|---|---|---|---|
| Comp. Ex. 4 (no membrane) | 1.0 | 2 | 1.0 | 1.0 |
| Ex. 2 at same feed rate and same gas split as Comp. Ex. 4 | 1.0 | 2 | 0.97 | 1.0 |
| Ex. 2 at same feed rate as Comp. Ex. 4 and change in gas split | 1.0 | 4 | 1.14 | 1.0 |
| | 1.0 | 6 | 1.20 | 1.0 |
| Ex. 2 at higher feed rate and same gas split as Comp. Ex. 4 | 1.05 | 2 | 1.01 | 1.05 |
| | 1.10 | 2 | 1.05 | 1.10 |
| Ex. 2 at higher feed rate as Comp. Ex. 4 and change in gas split | 1.05 | 4 | 1.20 | 1.05 |
| | 1.10 | 4 | 1.25 | 1.10 |

As can be seen from Table 7, by adding membranes and changing the gas split, higher gas production is realized. When the feed rate is increased, higher gas and oil production is realized.

TABLE 8

| | Total production (oil and gas) normalized relative to Comp. Ex. 4* | Wet gas split ratio (Plant 20 + Plant 25)/ Plant 24 | Compressor 16 load at 21 to 70 bar* | H$_2$S molar flow at Plant 20* | CO$_2$ molar flow at Plant 20* | Permeate Compressor 30 load vs Compressor 16 load at 3 bar to 22 bar | Compressor 33 load at 22 bar to 70 bar* |
|---|---|---|---|---|---|---|---|
| Comp. Ex. 4 (no membrane) | 1.0 | 2 | 1.0 | 1.0 | 1.0 | — | 1.0 |
| Ex. 2 at same feed rate and same gas split as Comp. Ex. 4 | 1.0 | 2 | 0.88 | 0.78 | 0.78 | 0.18 | 1.21 |
| Ex. 2 at same feed rate as Comp. Ex. 4 and change in gas split | 1.0 | 4 | 1.07 | 0.91 | 0.92 | 0.18 | 0.84 |
| | 1.0 | 6 | 1.15 | 0.96 | 0.98 | 0.17 | 0.70 |
| Ex. 2 at higher feed rate and same gas split as Comp. Ex. 4 | 1.05 | 2 | 0.93 | 0.83 | 0.82 | 0.16 | 1.25 |
| | 1.10 | 2 | 0.97 | 0.85 | 0.85 | 0.18 | 1.33 |
| Ex. 2 at higher feed rate as Comp. Ex. 4 and change in gas split | 1.05 | 4 | 1.14 | 0.96 | 0.98 | 0.17 | 0.87 |
| | 1.10 | 4 | 1.19 | 1.0 | 1.02 | 0.17 | 0.92 |

*Normalized relative to Comp. Ex. 4.

Example 2 (With the Membranes—25% Acid Gas Removal)

The configuration 500 shown in FIG. 5 was used. Like Comparative Example 5, a membrane 26 was added to the configuration of Comparative Example 4. The product stream 28 leaving the membrane 26 goes to plant 20 and plant 25. The permeate from the membrane goes to injection compressors 33 and 22. Using a HYSYS simulation model and assuming membrane 26 operating at 21 bar feed pressure, 3 bar permeate pressure and removal of 25% of acid gas (i.e. CO$_2$ and H$_2$S), a series of different scenarios were run as described in Table 7. The membrane performance in Table 1 was used in the simulation. The relative impact on gas production and oil production is given for each scenario. Table 8 shows the relative impact on compressor loads for each scenario.

As can be seen from Table 8, by adding membranes, the amine and Claus units at Plant 20 of the configuration 500 in FIG. 5 are de-bottlenecked as shown by the H$_2$S molar flow and the CO$_2$ molar flow; and by increasing gas split and/or by increasing well production either/both oil and gas products can be increased as seen in Table 7. By adding membranes and changing the gas split ratio, compressor 16 load is increased but the injection compressor 33 load is decreased.

Example 3 (With the Membranes—25% Acid Gas Removal)

The configuration 500 shown in FIG. 5 was used. FIG. 6 was consulted assuming a H2S/methane membrane selectivity of 20 and a desired hydrogen sulfide concentration in the permeate stream 50 vol %. From the plot, the pressure ratio was determined as about 7-8. Assuming a membrane 26 feed pressure of 21 bar, a permeate pressure of 3 bar was calculated. As a result, less of the permeate stream 29 is compressed in permeate compressor 30 and more gas is sent to plant 20 and plant 25. Operation at 7 bar permeate pressure (instead of 3 bar) stills removes 25% of acid gas. Table 9 below gives comparative data between permeate pressure of 3 bar (Ex. 4A) and permeate pressure of 7 bar (Ex. 4B).

TABLE 9

|  | Total production (oil and gas) normalized relative to Comp. Ex. 4 | Wet gas split ratio (Plant 20 + Plant 25)/ Plant 24 | Product sweet gas from Plant 20 | Product oil from Plant 20 and Plant 24 | $H_2S$ molar flow at Plant 20 | $CO_2$ molar flow at Plant 20 | Permeate Compressor 30 load vs Compressor 16 load at 3 bar to 22 bar | Compressor 33 load at 22 bar to 70 bar |
|---|---|---|---|---|---|---|---|---|
| Comp. Ex. 4 (no membrane) | 1.0 | 2 | 1.0 | 1.0 | 1.0 | 1.0 | — | 1.0 |
| Ex. 4A with membrane at 3 bar permeate pressure | 1.10 | 2 | 1.05 | 1.10 | 0.85 | 0.85 | 0.18 | 1.33 |
| Ex. 4B with membrane at 7 bar permeate pressure | 1.10 | 2 | 1.02 | 1.10 | 0.86 | 0.84 | 0.12 | 1.38 |

*Normalized relative to Comp. Ex. 4.

As can be seen from Table 9, increasing the permeate pressure from 3 to 7 bar decreases the compressor 30 load.

It should be noted that only the components relevant to the disclosure are shown in the figures, and that many other components normally part of a gas processing, an oil processing and/or a gas injection system are not shown for simplicity. From the above description, those skilled in the art will perceive improvements, changes and modifications, which are intended to be covered by the appended claims.

For the purposes of this specification and appended claims, unless otherwise indicated, all numbers expressing quantities, percentages or proportions, and other numerical values used in the specification and claims are to be understood as being modified in all instances by the term "about." Accordingly, unless indicated to the contrary, the numerical parameters set forth in the following specification and attached claims are approximations that can vary depending upon the desired properties sought to be obtained by the present invention. It is noted that, as used in this specification and the appended claims, the singular forms "a," "an," and "the," include plural references unless expressly and unequivocally limited to one referent.

Unless otherwise specified, the recitation of a genus of elements, materials or other components, from which an individual component or mixture of components can be selected, is intended to include all possible sub-generic combinations of the listed components and mixtures thereof. Also, "comprise," "include" and its variants, are intended to be non-limiting, such that recitation of items in a list is not to the exclusion of other like items that may also be useful in the materials, compositions, methods and systems of this invention.

What is claimed is:

1. A system for increasing oil and/or gas production in an integrated oil and gas production plant including hydrogen sulfide removal and sour-gas injection, comprising:

a. a separator for separating produced fluid from a subterranean reservoir into an associated gas stream containing 1-50% hydrogen sulfide by volume, a water stream and an oil stream;

b. an associated gas compressor for compressing a first portion of the associated gas stream to form a first compressed associated gas stream;

c. a hydrogen sulfide-selective membrane to remove hydrogen sulfide from the first portion of the associated gas stream and form a permeate stream enriched in hydrogen sulfide and a retentate stream depleted in hydrogen sulfide and enriched in hydrocarbon gases; wherein the hydrogen sulfide-selective membrane is upstream or downstream of the associated gas compressor;

d. a first gas processing plant for receiving a feed gas stream comprising the retentate stream and a portion of the oil stream from the separator, wherein the first gas processing plant includes an amine unit for removing hydrogen sulfide from the feed gas stream and producing a hydrogen sulfide-enriched stream and a hydrocarbon-enriched stream; and a Claus unit for producing elemental sulfur from the hydrogen sulfide-enriched stream;

e. a second gas processing plant for receiving and compressing a second portion of the associated gas stream and a portion of the oil stream from the separator to form a second compressed associated gas stream, wherein the second gas processing plant includes one or more gas compressors;

f. a permeate compressor or an eductor for increasing a permeate stream pressure of the permeate stream to form a compressed permeate stream; and g. a sour gas compressor for receiving and compressing the second compressed associated gas stream and the compressed permeate stream to form a sour gas injection stream for injecting into a subterranean formation; wherein the hydrogen sulfide-selective membrane is upstream of the associated gas compressor.

2. A method for increasing oil and/or gas production in an integrated oil and gas production plant including hydrogen sulfide removal and sour-gas injection, comprising:

a. separating a feed stream of produced fluid from a subterranean reservoir into an associated gas stream containing 1-50% hydrogen sulfide by volume, a water stream and an oil stream;

b. compressing a first portion of the associated gas stream in an associated gas compressor to form a first compressed associated gas stream;
c. passing the first compressed associated gas stream over a hydrogen sulfide-selective membrane to remove hydrogen sulfide from the first portion of the associated gas stream and form a permeate stream enriched in hydrogen sulfide and a retentate stream depleted in hydrogen sulfide and enriched in hydrocarbon gases; wherein the hydrogen sulfide-selective membrane is upstream or downstream of the associated gas compressor;
d. feeding a feed gas stream comprising the retentate stream and a gas stream separated from the oil stream to a first gas processing plant; wherein the feed gas stream passes through an amine unit for removing hydrogen sulfide from the feed gas stream thereby producing a hydrogen sulfide stream and a hydrocarbon enriched stream; and wherein the hydrogen sulfide stream passes through a Claus unit for removing sulfur from the hydrogen sulfide stream removed thereby producing elemental sulfur;
e. feeding a second portion of the associated gas stream to a second gas processing plant comprising one or more gas compressors wherein the second portion of the associated gas stream is compressed to form a second compressed associated gas stream;
f. increasing a permeate stream pressure of the permeate stream in a permeate compressor or an eductor to form a compressed permeate stream;
g. receiving and compressing the second compressed associated gas stream and the compressed permeate stream in a sour gas compressor to form a sour gas injection stream; and
h. injecting the sour gas injection stream into a subterranean formation;
wherein the hydrogen sulfide-selective membrane is upstream of the associated gas compressor.

3. A system for increasing oil and/or gas production in an integrated oil and gas production plant including hydrogen sulfide removal and sour-gas injection, comprising:
a. a separator for separating produced fluid from a subterranean reservoir into an associated gas stream containing 1-50% hydrogen sulfide by volume, a water stream and an oil stream;
b. an associated gas compressor for compressing a first portion of the associated gas stream to form a first compressed associated gas stream;
c. a hydrogen sulfide-selective membrane to remove hydrogen sulfide from the first portion of the associated gas stream and form a permeate stream enriched in hydrogen sulfide and a retentate stream depleted in hydrogen sulfide and enriched in hydrocarbon gases; wherein the hydrogen sulfide-selective membrane is upstream or downstream of the associated gas compressor;
d. a first gas processing plant for receiving a feed gas stream comprising the retentate stream and a portion of the oil stream from the separator, wherein the first gas processing plant includes an amine unit for removing hydrogen sulfide from the feed gas stream and producing a hydrogen sulfide-enriched stream and a hydrocarbon-enriched stream; and a Claus unit for producing elemental sulfur from the hydrogen sulfide-enriched stream;
e. a second gas processing plant for receiving and compressing a second portion of the associated gas stream and a portion of the oil stream from the separator to form a second compressed associated gas stream, wherein the second gas processing plant includes one or more gas compressors;
f. a permeate compressor or an eductor for increasing a permeate stream pressure of the permeate stream to form a compressed permeate stream;
g. a sour gas compressor for receiving and compressing the second compressed associated gas stream and the compressed permeate stream to form a sour gas injection stream for injecting into a subterranean formation; and
h. a control valve downstream of the hydrogen sulfide-selective membrane on the permeate stream for controlling a permeate stream pressure of the permeate stream.

4. A system for increasing oil and/or gas production in an integrated oil and gas production plant including hydrogen sulfide removal and sour-gas injection, comprising:
a. a separator for separating produced fluid from a subterranean reservoir into an associated gas stream containing 1-50% hydrogen sulfide by volume, a water stream and an oil stream;
b. an associated gas compressor for compressing a first portion of the associated gas stream to form a first compressed associated gas stream;
c. a hydrogen sulfide-selective membrane to remove hydrogen sulfide from the first portion of the associated gas stream and form a permeate stream enriched in hydrogen sulfide and a retentate stream depleted in hydrogen sulfide and enriched in hydrocarbon gases; wherein the hydrogen sulfide-selective membrane is upstream or downstream of the associated gas compressor;
d. a first gas processing plant for receiving a feed gas stream comprising the retentate stream and a portion of the oil stream from the separator, wherein the first gas processing plant includes an amine unit for removing hydrogen sulfide from the feed gas stream and producing a hydrogen sulfide-enriched stream and a hydrocarbon-enriched stream; and a Claus unit for producing elemental sulfur from the hydrogen sulfide-enriched stream;
e. a second gas processing plant for receiving and compressing a second portion of the associated gas stream and a portion of the oil stream from the separator to form a second compressed associated gas stream, wherein the second gas processing plant includes one or more gas compressors;
f. a permeate compressor or an eductor for increasing a permeate stream pressure of the permeate stream to form a compressed permeate stream; and
g. a sour gas compressor for receiving and compressing the second compressed associated gas stream and the compressed permeate stream to form a sour gas injection stream for injecting into a subterranean formation;
wherein when the eductor is present, the permeate compressor is not present.

5. The system of claim 3 or 4 wherein the hydrogen sulfide-selective membrane is downstream of the associated gas compressor.

6. The system of claim 1 or 3 or 4 wherein the hydrogen sulfide-selective membrane is a one-stage membrane.

7. The system of claim 3 further comprising a control system for adjusting the control valve in response to changes in a flow and/or a $H_2S$ concentration of the permeate stream.

8. A method for increasing oil and/or gas production in an integrated oil and gas production plant including hydrogen sulfide removal and sour-gas injection, comprising:
   a. separating a feed stream of produced fluid from a subterranean reservoir into an associated gas stream containing 1-50% hydrogen sulfide by volume, a water stream and an oil stream;
   b. compressing a first portion of the associated gas stream in an associated gas compressor to form a first compressed associated gas stream;
   c. passing the first compressed associated gas stream over a hydrogen sulfide-selective membrane to remove hydrogen sulfide from the first portion of the associated gas stream and form a permeate stream enriched in hydrogen sulfide and a retentate stream depleted in hydrogen sulfide and enriched in hydrocarbon gases; wherein the hydrogen sulfide-selective membrane is upstream or downstream of the associated gas compressor;
   d. feeding a feed gas stream comprising the retentate stream and a gas stream separated from the oil stream to a first gas processing plant; wherein the feed gas stream passes through an amine unit for removing hydrogen sulfide from the feed gas stream thereby producing a hydrogen sulfide stream and a hydrocarbon enriched stream; and wherein the hydrogen sulfide stream passes through a Claus unit for removing sulfur from the hydrogen sulfide stream removed thereby producing elemental sulfur;
   e. feeding a second portion of the associated gas stream to a second gas processing plant comprising one or more gas compressors wherein the second portion of the associated gas stream is compressed to form a second compressed associated gas stream;
   f. increasing a permeate stream pressure of the permeate stream in a permeate compressor or an eductor to form a compressed permeate stream;
   g. receiving and compressing the second compressed associated gas stream and the compressed permeate stream in a sour gas compressor to form a sour gas injection stream;
   h. injecting the sour gas injection stream into a subterranean formation; and
   i. controlling a permeate stream pressure of the permeate stream using a control valve downstream of the hydrogen sulfide-selective membrane on the permeate stream.

9. A method for increasing oil and/or gas production in an integrated oil and gas production plant including hydrogen sulfide removal and sour-gas injection, comprising:
   a. separating a feed stream of produced fluid from a subterranean reservoir into an associated gas stream containing 1-50% hydrogen sulfide by volume, a water stream and an oil stream;
   b. compressing a first portion of the associated gas stream in an associated gas compressor to form a first compressed associated gas stream;
   c. passing the first compressed associated gas stream over a hydrogen sulfide-selective membrane to remove hydrogen sulfide from the first portion of the associated gas stream and form a permeate stream enriched in hydrogen sulfide and a retentate stream depleted in hydrogen sulfide and enriched in hydrocarbon gases; wherein the hydrogen sulfide-selective membrane is upstream or downstream of the associated gas compressor;
   d. feeding a feed gas stream comprising the retentate stream and a gas stream separated from the oil stream to a first gas processing plant; wherein the feed gas stream passes through an amine unit for removing hydrogen sulfide from the feed gas stream thereby producing a hydrogen sulfide stream and a hydrocarbon enriched stream; and wherein the hydrogen sulfide stream passes through a Claus unit for removing sulfur from the hydrogen sulfide stream removed thereby producing elemental sulfur;
   e. feeding a second portion of the associated gas stream to a second gas processing plant comprising one or more gas compressors wherein the second portion of the associated gas stream is compressed to form a second compressed associated gas stream;
   f. increasing a permeate stream pressure of the permeate stream in a permeate compressor or an eductor to form a compressed permeate stream;
   g. receiving and compressing the second compressed associated gas stream and the compressed permeate stream in a sour gas compressor to form a sour gas injection stream;
   h. injecting the sour gas injection stream into a subterranean formation; and
   i. feeding the permeate stream to a suction inlet of the eductor and feeding a gas stream having a pressure higher than the permeate stream to a motive inlet of the eductor to form the compressed permeate stream.

10. The method of claim 8 or 9 wherein the hydrogen sulfide-selective membrane is downstream of the associated gas compressor.

11. The method of claim 8 further comprising adjusting the control valve in response to changes in a flow and/or a $H_2S$ concentration of the permeate stream.

* * * * *